May 8, 1962 W. G. CREAVEY 3,033,582
PRESSURE ACTUATED SEAL

Filed Sept. 9, 1959 2 Sheets-Sheet 1

INVENTOR.
WILLIAM G. CREAVEY.
BY
*a. m. Shapiro*
ATTORNEY.

May 8, 1962 W. G. CREAVEY 3,033,582
PRESSURE ACTUATED SEAL
Filed Sept. 9, 1959 2 Sheets-Sheet 2

INVENTOR.
WILLIAM G. CREAVEY
BY
ATTORNEY.

United States Patent Office 3,033,582
Patented May 8, 1962

3,033,582
PRESSURE ACTUATED SEAL
William G. Creavey, 20305 Parthenia St.,
Los Angeles, Calif.
Filed Sept. 9, 1959, Ser. No. 838,904
6 Claims. (Cl. 277—180)

The present invention relates to pressure actuated seals of the type having a plastic substance disposed in sealing contact with the mating surfaces desired to be sealed and, more particularly, to an improved seal of such type which performs at extremely high fluid pressures without rupturing or otherwise failing.

In the past, it has been found to be desirable to provide a seal between two pipes or other hollow conduits for high pressure fluids in which the seal is responsive to increased pressures for increasing the sealing action. Seals having many different types of configurations have been developed for this purpose. Until recently, almost all of the seals have been of the metal-to-metal type so that a metallic surface of the seal is in contact with a metallic mating surface or surfaces of the conduits being coupled. With high pressures, it was found to be necessary that the surfaces of both the seal and the mating conduits be highly polished in order to eliminate minute scratches and other surface imperfections which would permit leakage of the fluid. The expenses involved were obviously high both because of the degree of polishing required and the dimensional tolerances necessarily maintained. In recent times, there have been developed pressure actuated seals having a surface layer composed of a plastic material, such as Teflon, whereby the Teflon, under pressure, flows (in its dry form) into the scratches or other blemishes upon the mating surfaces of the conduits as well as the seal itself, thereby eliminating the need for either a very finely polished surface or extremely close dimensional tolerances. Such a seal operates generally on a principle of increased sealing area with increased fluid pressures. Theoretically, no matter how high the pressure upon the seal becomes, there should always be a layer of sealing substance between the body of the seal and the mating surface. However, in practice, it has been found that very high fluid pressures cause the seal to cut through the sealing material in at least one location, thereby destroying the effectiveness of the seal completely. Further, high pressures often cause the seal body to buckle or otherwise deform so as to release the sealing pressure against the plastic material. Such deformation usually exceeds the elastic limit of the body material so that the seal is no longer usable. Even if the permanent deformation does not cause leakage under the extremely high pressure which caused such deformation, the seal may leak during the process of pressure reduction because of inability to return to its low-pressure configuration.

According to the present invention, a pressure actuated seal provided with an arm portion which deflects under increased fluid pressures and having a raised portion with a sealing substance disposed thereon is further provided with a stop portion dimensionally higher than such raised portion but lower than the additional height obtained on such raised portion by the disposition of a sealing substance thereon so that such stop portion will prevent the raised portion and the sealed surface from ever contacting each other through the sealing substance. In accordance with the present invention, there is additionally provided a second stop portion disposed in accordance with the configuration of the arm portion so as to tend to maintain such configuration by preventing buckling under extreme pressures, thereby further aiding in the prevention of seal cut-through.

Accordingly, it is one of the objects of the present invention to provide a pressure actuated seal which is operable at extremely high pressures.

Another object of this invention is to provide a pressure actuated seal which will not buckle at high pressures.

A further object of the present invention is to provide a pressure actuated seal which can be cycled between low and extremely high pressures without failure.

Another object of this invention is to provide a pressure actuated seal having a basic body configuration which may be dimensionally standardized for all pressures of operation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a vertical section of a seal in accordance with the present invention disposed in sealing relationship between a pair of coupled conduits;

Figure 2:
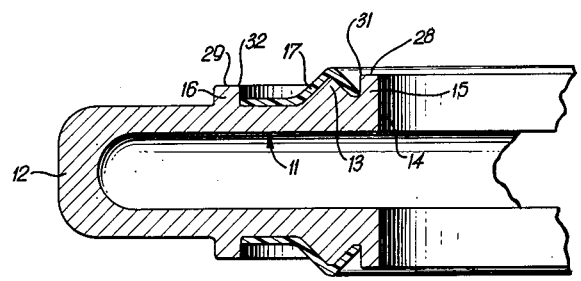
FIGURE 2 is an enlarged fragmentary sectional view of the seal illustrated in FIGURE 1.

Referring to the drawings, there is seen a generally ring-shaped seal 10. It may be seen that the seal 10 is preferably symmetrical on both sides of an imaginary horizontal plane through the center of the seal; therefore, for convenience of description, only the portion of the seal above such imaginary horizontal plane will be described hereinafter. Further it may be seen that, although the seal is generally circular in its overall configuration, the seal may be regarded in just its cross-sectional aspects as illustrated in FIGURES 2 to 5, inclusive, since the various functions take place as though the seal were two-dimensional in a vertical plane.

The seal 10 has an arm portion 11 which may be regarded as a lever arm pivoted from the rim portion 12 so as to be capable of deflection in a vertical plane. The arm portion 11 has an upward sealing projection 13 located near the end 14 of the arm 11. The sealing projection 13 preferably is rounded to prevent cut-through, as explained hereafter. An end projection 15 is located even closer to the end 14 of the arm 11 and preferably at the very end, and projects upwardly a distance slightly greater than the extent of upward projection of the sealing projection 13. A middle projection 16 is disposed substantially midway along the effective length of the arm portion 11 as measured between the rim portion 12 and the end 14 of the arm 11. The middle projection 16 extends upwardly a distance preferably slightly less than the sealing projection 13. Disposed over the sealing projection 13 is a layer 17 of plastic material, such as Teflon. The plastic layer 17 initially has a thickness sufficient to extend the effective height of the sealing projection 13 above the height of the end projection 15 so that, upon initial coupling together of the fluid conduits 18 and 19, the conduits will initially contact the plastic layer 17 for effectuating a seal.

Figure 1:
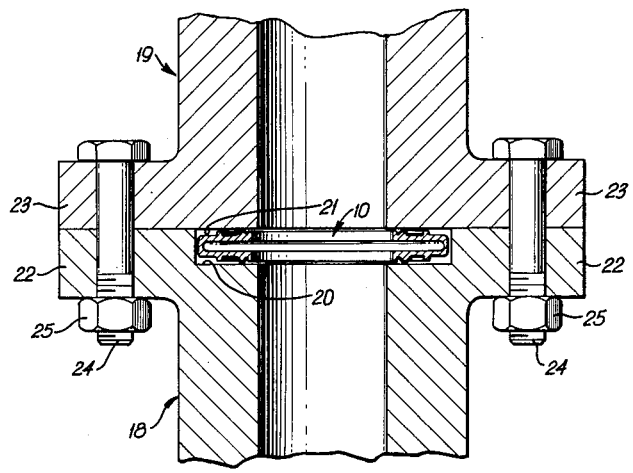
Figure 3:
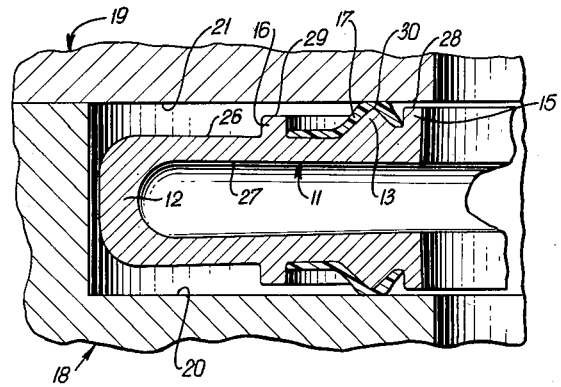
FIGURE 3 is an enlarged sectional view, similar in aspect to FIGURE 2, showing the configuration of the seal when the conduits have been coupled together but fluid under pressure has not yet been introduced.

As seen in FIGURE 1, the conduits 18 and 19 may be provided with surfaces 20 and 21, respectively, to be sealed by contact with the seal 10 against leakage of the fluid (not shown) flowing through the conduits. The conduits 18 and 19 may be provided with annular flanges 22 and 23, respectively, through which a plurality of bolts 24 may be secured by nuts 25 for obtaining initially sealed engagement between the seal 10 and the surfaces 20 and 21. Referring to FIGURE 3, the seal 10 is shown in its configuration established by the aforesaid initially sealed engagement with the surfaces 20 and 21 upon the coupling together of the conduits 18 and 19. The vertical dimensions of the seal 10 and the distance between the surfaces 20 and 21 are correlated so that the initial coupling engagement squeezes the plastic layer 17 disposed over the sealing projection 13 with sufficient force to cause the material of the layer 17 to fill and seal any minute scratches or imperfections in the surface 21 and the surface of the projection 13, and such sealing force will be sufficient also to withstand initial fluid pressures when fluid is introduced into the conduits 18 and 19. In response to the force exerted upon layer 17 and the sealing projection 13, the arm portion 11 will deflect downwardly slightly. The seal 10 may be composed of any convenient material, such as aluminum or an alloy thereof, and the thickness of the arm portion 11 defined by its outer surface 26 and its inner surface 27 is sufficiently thin to permit deflection of the arm portion 11, as will be discussed more fully hereafter. The upper surface 28 of the end projection 15 will not be in contact with the surface 21. The upper surface 29 of the middle projection 16 also will not be in contact with the surface 21.

Figure 4:
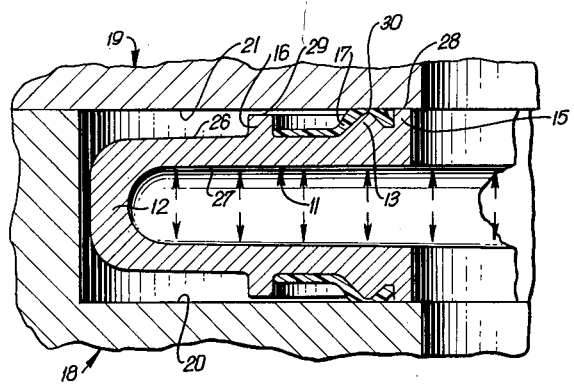
FIGURE 4 is the same view as FIGURE 3 but with fluid pressure present.

Upon the introduction of fluid under pressure through the conduits 18 and 19, the arm portion 11 will be deflected upwardly as a result of the force exerted against the inner surface 27 by the fluid pressure indicated by the vertical arrows shown in FIGURE 4. Thus, the greater is the magnitude of fluid pressure, the greater is the force with which the sealing projection 13 presses the plastic layer 17 against the surface 21 of the conduit 19. As the fluid pressure is increased, the thickness of the layer 17 between the upward extremity 30 of the sealing projections 13 and the surface 21 will be decreased somewhat proportionally. However, before such extremity 30 can come into contact with the surface 21, causing cut-through of the layer 17 and thus eliminating the sealing effect of the layer, the upper surface 28 of the end projection 15 contacts the surface 21 to act as a means for limiting the deflection of the end portion 14 of the arm 11. The thickness of the arm 11 and the horizontal distance between the sealing projection 13 and the end projection 15 are chosen so as to effectively prevent any substantial further deflection of the sealing projection 13 toward the surface 21, as illustrated in FIGURE 4. It should be noted that the upper surface 29 of the middle projection 16 still has not contacted the surface 21.

Figure 5:
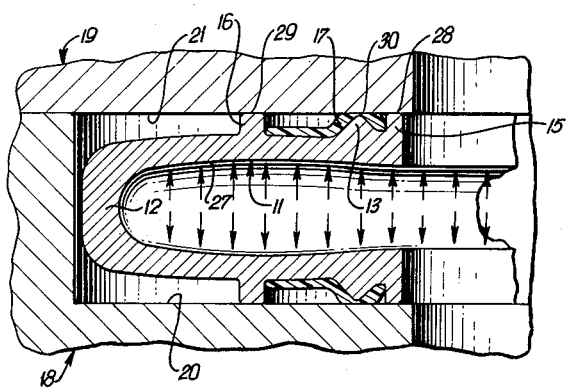
FIGURE 5 is a view similar to FIGURES 3 and 4 showing the configuration of the seal under extremely high fluid pressures.

Referring to FIGURE 5, there may be seen the configuration of the seal resulting from greatly increasing the pressure of the fluid over that pressure sufficient to cause the configuration illustrated in FIGURE 4. Continued upward deflection of the arm 11 will be confined primarily to the middle portion thereof since the end projection 15 is solidly disposed against the unyielding surface 21. Therefore, upon the occurrence of excessive fluid pressure in the conduits 18 and 19, the middle projection 16 will be deflected upwardly until its surface 29 contacts the surface 21 so as to prevent further deflection of the middle portion of the arm 11. The heights of the sealing, end and middle projections 13, 15 and 16, respectively, are chosen so that both the end projection 15 and the middle projection 16 will contact the surface 21 before the sealing projection 13 could possibly do so, thereby retaining sufficient material in the layer 17 between the sealing projection 13 and the surface 21 to maintain the necessary sealing action under the pressures which cause the aforesaid limiting occurrences.

The configuration shown in FIGURE 5 is substantially rigid so that further deflection of any part of the arm 11 is negligible. The material of the seal 10 and the thickness of the arm 11 are selected so that the deflection illustrated in FIGURE 5 will not cause the material of the seal to exceed its elastic limit. Hence, even after the seal has been exposed to the extreme pressure condition exemplified by FIGURE 5, a reduction of the pressure will permit the arm 11 to return to its original configuration, and the seal may be used repeatedly and exposed to pressure cycling without damage.

Although the layer 17 may be composed of a material other than Teflon, Teflon is preferable because of its various characteristics such as, for example, its ability to flow under pressure, return to its normal shape after the removal of the pressure, and fill even the most minute scratches and imperfections in the surface 21 and the surface of the sealing projection 13 so as to seal such scratches and imperfections against the fluid. Further, Teflon is readily available in tape form and in different thicknesses so that a layer of desired thickness may be readily disposed over the sealing projection 13. It should be noted that the provision of the end and middle projections 15 and 16 permits a considerable saving in the cost of material and labor involved in disposing the plastic material layer 17 upon the arm 11 since the layer need not extend over the entire outer surface 26 of the arm 11 and may be readily trimmed by passing a sharp instrument around the entire seal at the edges 31 and 32 provided by the surfaces 28 and 29, respectively.

In the absence of the end projection 15, the layer 17 would be exposed to the action of the fluid in the conduits 18 and 19 and may be torn in a ragged manner, especially if such fluid is turbulent, and pieces of the layer 17 may be torn away by the fluid and contaminate the fluid. The pressures at which such an event might occur would be sufficient to cause the seal to attain the configuration shown in FIGURE 4 wherein the surface 28 of the end projection 15 abuts against the surface 21, thereby preventing fluid turbulence from having any effect upon the layer 17.

The disposition of the layer 17 between the projections 15 and 16 eliminates the presence of an exposed edge of the layer, thereby practically eliminating the possibility of the layer being accidentally peeled away from the arm 11 by rough handling or other contact.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A pressure actuated fluid seal comprising at least one arm portion having an inner surface and an outer surface and adapted for substantially parallel disposition with respect to a surface to be sealed against fluid under pressure, said inner surface being exposed to such fluid, said arm portion being capable of outward deflection in response to such fluid pressure against said inner surface; said outer surface of said arm portion being provided with only one sealing projection and first and second deflection limiting projections; and a layer of plastic material disposed upon said sealing projection for sealing contact with such surface to be sealed, said sealing projection and said layer initially having a combined height greater than the individual heights of said first and second limiting projections, said first limiting projection having a height greater than the height of said sealing projection to prevent cut-through of said layer by said sealing projection at high fluid pressures.

2. A seal as defined in claim 1 wherein said sealing projection and said first limiting projection are located adjacent each other.

3. A seal as defined in claim 1 wherein said sealing projection and said first limiting projection are located adjacent each other, and said second limiting projection is located so as to bracket said sealing projection with said first limiting projection.

4. A seal as defined in claim 3 comprising a rim portion, said arm portion having first and second ends, said first end being integral with said rim portion, and said first limiting projection being located substantially at said second end.

5. A seal as defined in claim 4 wherein said second limiting projection is located substantially midway between said first and second ends.

6. A pressure actuated fluid seal comprising: a circular rim portion; a pair of arm portions each having a first end and a second end, each of said first ends being integral with said rim portion, each of said arm portions having an inner surface and an outer surface and adapted for substantially parallel disposition with respect to a respective surface to be sealed against fluid under pressure, said inner surfaces being exposed to such fluid, and each of said arm portions being capable of outward deflection in response to such fluid pressure against its respective said inner surface; said outer surface of each of said arm portions being provided with only one sealing projection and a deflection limiting projection; and a layer of plastic material disposed upon each said sealing projection for sealing contact with such respective surface to be sealed, each said limiting projection having a height greater than the height of its corresponding said sealing projection to prevent cut-through of said layer by said sealing projection at high fluid pressures, and said layer being initially thicker than the difference in heights of said sealing and limiting projections.

References Cited in the file of this patent
UNITED STATES PATENTS

| | | |
|---|---|---|
| 1,965,273 | Wilson | July 3, 1934 |
| 2,191,044 | Seligman | Feb. 20, 1940 |
| 2,269,486 | Santoro | Jan. 13, 1942 |
| 2,401,923 | Gleeson | June 11, 1946 |